(12) United States Patent
Antal, Jr.

(10) Patent No.: US 7,405,020 B2
(45) Date of Patent: Jul. 29, 2008

(54) CARBONIZED CHARCOAL ELECTRODE

(75) Inventor: Michael J. Antal, Jr., Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 185 days.

(21) Appl. No.: 10/552,004

(22) PCT Filed: Apr. 7, 2004

(86) PCT No.: PCT/US2004/010882

§ 371 (c)(1),
(2), (4) Date: Jul. 28, 2006

(87) PCT Pub. No.: WO2004/093222

PCT Pub. Date: Oct. 28, 2004

(65) Prior Publication Data

US 2007/0202387 A1 Aug. 30, 2007

Related U.S. Application Data

(60) Provisional application No. 60/461,212, filed on Apr. 7, 2003.

(51) Int. Cl.
*H01M 4/96* (2006.01)

(52) U.S. Cl. .................. 429/40; 429/231.8; 429/233; 429/234; 429/235; 429/239; 429/245; 204/294; 29/746

(58) Field of Classification Search .............. 429/40, 429/231.8, 233, 234, 235, 238, 239, 245; 204/294; 29/746
See application file for complete search history.

(56) References Cited

U.S. PATENT DOCUMENTS

| 3,741,809 | A | | 6/1973 | Anbar |
|---|---|---|---|---|
| 3,970,474 | A | | 7/1976 | Anbar et al. |
| 5,948,329 | A | * | 9/1999 | Ohsaki et al. ............ 264/29.4 |
| 5,985,489 | A | * | 11/1999 | Ohsaki et al. ............ 429/231.7 |
| 6,103,373 | A | * | 8/2000 | Nishimura et al. ......... 428/368 |
| 6,200,697 | B1 | | 3/2001 | Pesavento |
| 6,475,461 | B1 | * | 11/2002 | Ohsaki et al. ........... 423/445 R |
| 6,692,861 | B2 | | 2/2004 | Tao |

OTHER PUBLICATIONS

Kazuhiro Mochidzuki, et al., "Electrical and Physical Properties of Carbonized Charcoals", *Ind. Eng. Chem. Res.* 2003, 42, pp. 5140-5151.

(Continued)

*Primary Examiner*—Bruce F Bell
(74) *Attorney, Agent, or Firm*—Weaver Austin Villeneuve & Sampson LLP

(57) ABSTRACT

An apparatus (1) for use of carbonized charcoal powder as an electrode is provided. Charcoal is provided as a powder, carbonized, and placed in a container (16) by which compressive pressure is applied to the carbonized-charcoal powder via one or more sides of the container (16). As a result of the compressive pressure the packed-bed (11) of carbonized-charcoal powder manifests a resistivity of less than about 1 ohm-cm and is suitable for use as an electrode in a fuel cell, battery or electrolyzer. The apparatus is adapted with electrical contacts (8, 9, 10) to conduct electric flow to or from the electrode and adapted for communication of an electrolyte with the electrode.

16 Claims, 5 Drawing Sheets

OTHER PUBLICATIONS

Williams, K.R., Ed., *An Introduction to Fuel Cells*, Elsevier Publishing Co.: Amsterdam, 1966.

Bockris, J.O. M.; Srinivasan, S., *Fuel Cells: Their Electrochemistry*, McGraw-Hill Book Co.: New York, 1969.

Vielstich, W., *Fuel Cells*, Wiley-Interscience: London, 1965.

Gur, T.M.; Huggins, R.A., "Direct Electrochemical Conversion of Carbon to Electrical Energy in a High Temperature Fuel Cell", *J. Electrochem. Soc.*, 1992, 139, L95.

Antal, M.J.; Gronlin, M.G., "The Art, Science, and Technology of Charcoal Production", *Ind. Eng. Chem. Res.*, 2003, 42, 1619.

Ford, A.R.; Greenhalgh, E., "Industrial Applications of Carbon and Graphite", *Modern Aspects of Graphite Technology*; L.C.F. Blackman, Eds.; Academic Press: London, 1970; p. 258.

Coutinho, A.R.; Luengo, C.A., "Preparing and Characterizing Electrode Grade Carbons from Eucalyptus Pyrolysis Products", *Advances in Thermochemical Biomass Conversion*, A.V. Bridgwater, Eds.; Blackie.

Coutinho, A.R.; Luengo, C.A., "Mass Balance of Biocarbon Electrodes Obtained by Experimental Bench Production", *Developments in Thermochemical Biomass Conversion*; A.V. Bridgwater and D.G.B. Boocock, Eds.; Blackie Academic & Professional: London, 1997; p. 305.

Coutinho, A.R.; Rocha, J.D.; Luengo, C.A., "Preparing and characterizing biocarbon electrodes", *Fuel Processing Technology*, 2000, 67, 93.

S. Mrozowski, "Studies Of Carbon Powders Under Compression I", Proceedings of the third Biennial Carbon Conference, 1957, Perganon Press, pp. 495-508.

* cited by examiner

Solid line: 20/40 mesh. Dashed line: powder.
Each curve shows depressurization #2.

Left side: 20/40 mesh. Right side: powder.
●: pressurization #1, ○: depressurization #1,
■: pressurization #2, □: depressurization #2.

CARBONIZED CHARCOAL ELECTRODE

RELATED APPLICATIONS

Priority is claimed to International Application No. PCT/US2004/010882 filed on Apr. 7, 2004, and to U.S. Provisional Patent Application No. 60/461,212, Apr. 7, 2003, both of which are hereby incorporated by reference.

GOVERNMENT LICENSE RIGHTS

The U.S. Government has a paid-up license in this invention and the right in limited circumstances to require the patent owner to license others on reasonable terms as provided for by the terms of Contract No. N00014-01-1-0928 by the Office of Naval Research.

FIELD OF THE INVENTION

This invention relates to the use of carbonized charcoal as an electrode in a fuel cell, battery or electrolyzer.

BACKGROUND OF THE INVENTION

Carbon batteries played an important role in the history of fuel cell research. In 1855 Becquerel attempted to build a fuel cell that generated electricity by the electrochemical combustion of coal.[1, 2] However, the electrolyte contained a nitrate that attacked the carbon without producing a current. By the end of the 19$^{th}$ century the increasing demand for electric power in Europe began to consume considerable amounts of coal because the conversion efficiency was very low.[3] Contemplating this problem, in 1894 Ostwald[3] called for development of a fuel cell that would react coal with oxygen to produce electricity more efficiently than thermo-mechanical equipment. Jacques[3] demonstrated a 1.5 kW battery that employed a consumable carbon anode, an iron cathode, and an air-bubbled alkali hydroxide electrolyte to generate 0.9 V at 400-500° C. Operating intermittently, this battery delivered power with an overall efficiency of 32% during a six-month period. The experiment failed because carbonates accumulated in the electrolyte that halted the electrochemistry.[3] In 1937 Baur and Preis[2] tested a fuel cell that used a coke anode and an electrolyte composed of zirconia stabilized with magnesia or yttria at >1000° C. Summarizing the status of carbon fuel cell research as of 1969, Bockris and Srinivasen[2] concluded that carbon fuel cells are impractical because (i) coal is not an electrical conductor, and (ii) graphite is too scarce and expensive to be used as a fuel.

Interest in carbon fuel cells resurfaced during the 1970's, when the Stanford Research Institute (SRI) attempted to develop a coal based fuel cell that employed molten lead at temperatures of 500 to 900° C.[4, 5] Gur and Huggins[6] demonstrated a high temperature (725 to 955° C.) fuel cell that employed stabilized zirconia as a solid electrolyte and a graphite anode.

Other consumable anodes in carbon fuel cells are disclosed by Pesavento[7] and Tao[8].

Charcoal is mentioned as an anode material, however raw charcoal is not a conductor of electricity. Charcoal is the carbonaceous residue of biomass pyrolysis (thermal decomposition in the absence of oxygen) or starved-air combustion (combustion with insufficient oxygen to permit complete combustion). A good quality charcoal has a fixed-carbon content as measured by ASTM D 1762-84 in excess of about 70%. Fixed-carbon contents above 70% may be realized by heating the charcoal to temperatures of about 400° to 500° C. A representative chemical formula for charcoal is $CH^{0.60}O_{0.13}$.[8a] When higher carbon content is desired, charcoal is carbonized by heat treatment in the absence of oxygen at temperatures above 500° C. Carbonized charcoals can have carbon contents in excess of 94 wt. %. Some carbonized charcoals are purer forms of carbon than natural graphites.

It is known that carbonized charcoal can possess very high electrical conductivities. In 1810 carbonized-charcoal electrodes were used in an arc lamp, and in 1830 carbonized charcoal was used as an electrode for primary batteries. These electrodes were made from powdered charcoal or coke bonded with sugar syrup or coal tar, pressed and carbonized at high temperatures.[9] Others[10-12] have reported extensive studies of biocarbon electrodes manufactured from charcoal particles bonded together by wood tar and subsequently carbonized. However, the high costs associated with molding, bonding, and carbonizing powdered charcoal makes this approach commercially impractical.

Accordingly, an object of the present invention is to provide an apparatus to enable carbonized-charcoal powder without bonding or molding to be used as an electrode in a fuel cell, battery or electrolyzer.

It is a further object of the present invention to provide carbonized-charcoal powder as the consumable anode of a biocarbon fuel cell.

It is a further object of the present invention to provide carbonized-charcoal powder as an electrode of a hydrogen fuel cell, battery or electrolyzer.

These and other objects and advantages to the present invention will be readily apparent upon reference to the drawing and the following description.

SUMMARY OF THE INVENTION

The present invention provides a method and apparatus for using carbonized charcoal powder as an electrode, wherein the method comprises the steps of (i) loading carbonized-charcoal powder which is carbonized at a temperature above about 900° C. into an apparatus having at least one electrical contact with the powder for providing flow of electricity to or from the carbonized powder wherein the apparatus is adapted for communication of an electrolyte with the carbonized powder; and (ii) applying a compressive force to the carbonized-charcoal powder in the apparatus sufficient to form a compressed bed wherein the bed is characterized by a resistivity of less than about 1 ohm-cm.

The apparatus is used to compress the carbonized charcoal powder and is then useful as an electrode, the apparatus comprising a housing containing a bed of carbonized charcoal powder having a proximal, distal and at least one side surface; a moveable piston in contact with the proximal surface for applying compressive force to compress the bed sufficiently to reduce the resistivity to less than about 1 ohm-cm; at least one electrical contact with the bed to conduct electric current flow into or out of the bed; a device for applying a force to the piston sufficient to cause surface pressure against the bed of at least about 1 MPa; and a porous wall in contact with the bed to conduct liquid or gaseous electrolyte to and from the bed.

The apparatus may also comprise a resistance-measuring device to determine the resistivity of the compressed electrode.

The pressure applied to compress the powder will generally be from about 1 to 10 MPa applied to one surface of the packed powder. In any case, sufficiency of the compressive force may be readily determined by measurement of the electrical resistivity of the compressed electrode. More than one compression application may be required, but typically the desired resistivity is attainable in one compression application. After sufficient resistivity has been attained, the pressure may be released, although it is preferable to keep the pressure applying device in contact with the electrode to ensure the mechanical integrity of the electrode and to provide another electrical conduit to the electrode.

The charcoal will be provided in particulate form, so it must be ground to an average particle size of less than about 10 mm, typically 1 mm or less. The particles will be carbonized by heating to a temperature of at least about 900° C. for several minutes. This carbonized powder will then be loaded into the apparatus serving as both the compressor to form the electrode and as the electrode device itself applicable for use in a fuel cell, battery or electrolyzer.

The source of charcoal may be any biomass that may be pyrolyzed to a fixed-carbon content in excess of about 70%.

After compression the electrode must have a measured resistivity of less than about 1 ohm-cm as measured across opposing faces of the electrode mass where each face serves as the entire electrical contact surface. Typical useful resistivities are about 0.5 ohm-cm or less.

The electrode may be used in known applications utilizing carbon electrodes, such as in a fuel cell, battery or electrolyzer. Therefore the apparatus must have a conduit in electrical communication with the electrode so that it may be connected to an electrical source or appliance, depending upon the particular application. Also, some or all of the walls adjacent to and in contact with the electrode may be made of a porous material to bring a liquid or gaseous electrolyte into contact with the electrode from the exterior of the apparatus. Electrolytes useful in fuel cells, batteries and electrolyzers in conjunction with carbon electrodes are known in the art.

DESCRIPTION OF THE DRAWINGS

The accompanying

DESCRIPTION OF THE PREFERRED EMBODIMENT

To ensure that the charcoal has a high electrical conductivity, it must be heated ("carbonized") at a temperature of at least about 900° C. or more for at least a few minutes prior to its use as an electrode. Usually the charcoal carbonization step is accomplished in an oxygen-free environment, but some oxygen (i.e. air) can be present. The charcoal may be ground either before or after carbonization to a fine particle size, preferably so that a substantial portion (greater than about 80% of the particles) are of a size <1 mm. If the charcoal is not ground prior to carbonization, the carbonization time must be sufficient to permit the center of the largest charcoal lumps to reach the desired carbonization temperature and remain at that temperature for a few minutes.

Figure 1:
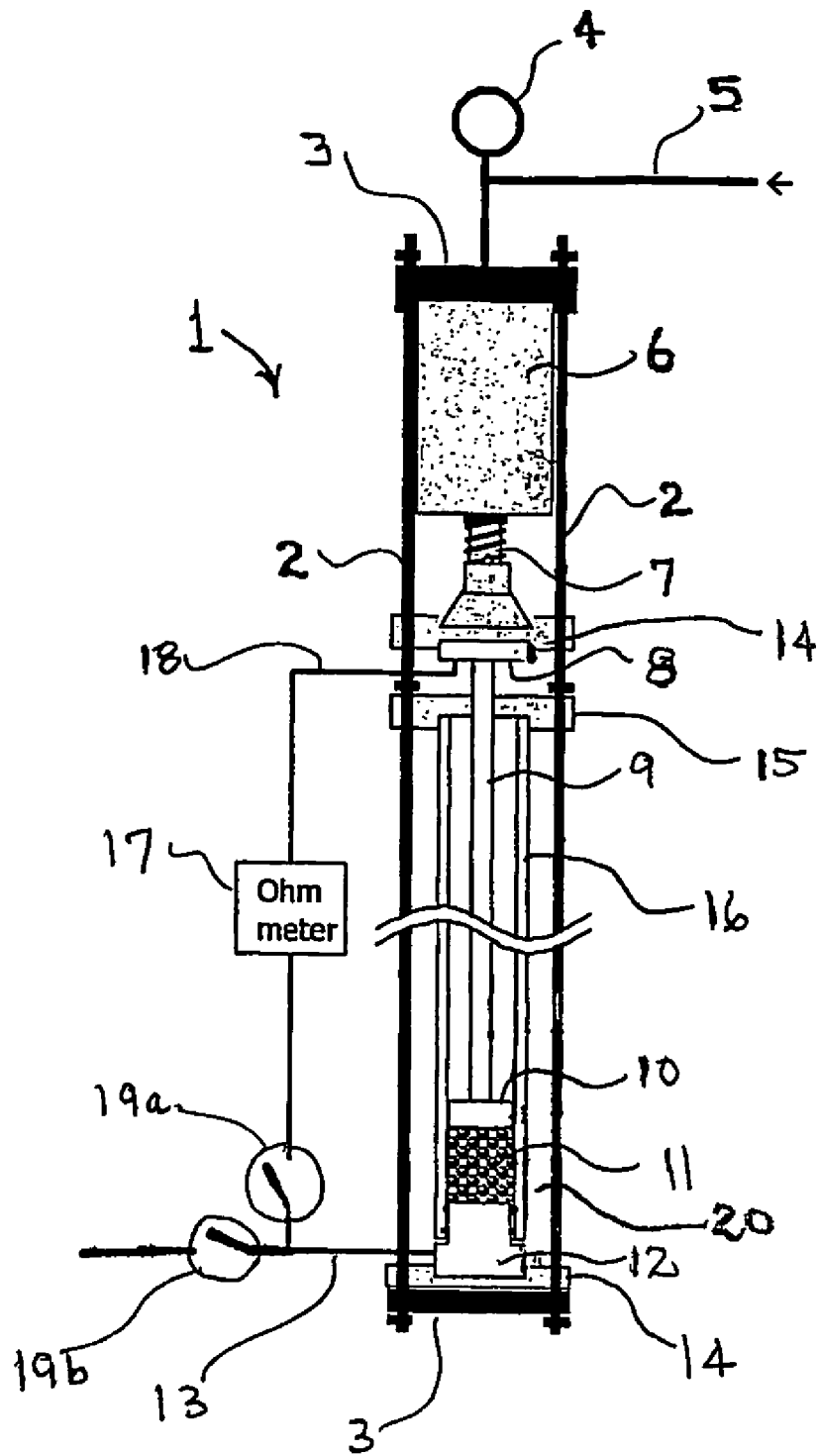
FIG. 1 is a cross-section elevational view of a preferred electrode according to the invention which also serves as an apparatus for performing the method of the invention.

Referring to FIG. 1, an apparatus 1 according to the invention comprises a vertical, cylindrical tube 16 that retains the carbonized-charcoal bed 11, a piston 10 within the tube 16 that delivers a compressive force to the carbonized-charcoal bed 11, and a base 12 within the tube 16 that retains the carbonized-charcoal bed against the compressive force of the piston. The piston 10, the base 12, or the tube 16 must be fabricated from an electrically conductive material to enable electricity to flow to or from the carbonized-charcoal bed. If sufficient electrical connection is made with piston 10 and base 12, tube 16 may be made of a porous insulator, such as alumina, to provide for a liquid or gaseous electrolyte a way to contact the bed 11. The electrolyte may be provided in the annular space 20 and may communicate with another electrode (not shown) through appropriate interelectrode connection (not shown). An electrically conductive wire 13 leads to a source or sink for electrons (not shown). Force may be applied to the piston by a pneumatic or hydraulic cylinder 6 that can be held conveniently by framework 2 that also supports the tube 16 and the base 12. Alternatively, instead of base 12, another piston and cylinder arrangement similar to 4 through 10 may be used. In that case, bed 11 will be compressed between two moveable pistons.

A pressure transducer 4 may be used to monitor and control the force delivered to the piston 10. When the carbonized-charcoal electrode is used in a battery or fuel cell, the tube 16 may be made of a porous material to permit a liquid or gaseous electrolyte to contact the carbonized-charcoal bed 11. In some cases it may be desirable to electrically isolate the carbonized-charcoal bed 11 from the support framework 2 and end walls 3. In this case electrical insulators 14 (e.g. Teflon) may be employed.

Air or hydraulic fluid may be applied through conduit 5 to drive the cylinder 6. The reach to piston 8 can be adjusted with screw jack 7. The piston 10 is attached to plunger rod 9 and receiving piston 8. To provide another electrical connection to the bed 11, the pistons 8 and 10 and rod 9 are all electrically conductive and electrically connected to wire 18. Tube 16 and rod 9 are supported and electrically insulated from framework 2 by insulating disk 15 (such as Teflon).

If desired, tube 16 may be fabricated of an electrically conductive material and electrically insulated from either piston 10 or base 12. Wire 18 or 13 will then be connected to tube 16 instead of piston 8 or base 12. If tube 16 is electrically conductive, then contact of bed 11 with the electrolyte will be through piston 10 or base 12, either of which may be fabricated of a porous material.

The resistivity of the bed 11 may be measured by ohmmeter 17 by opening switch 19b and closing switch 19a. When the apparatus 1 is used as electrode in a fuel cell, battery or electrolyzer, switch 19a is open and switch 19b is closed.

The following examples are provided for the purpose of illustration and are not intended to limit the invention in any way.

EXAMPLE 1

Figure 2:
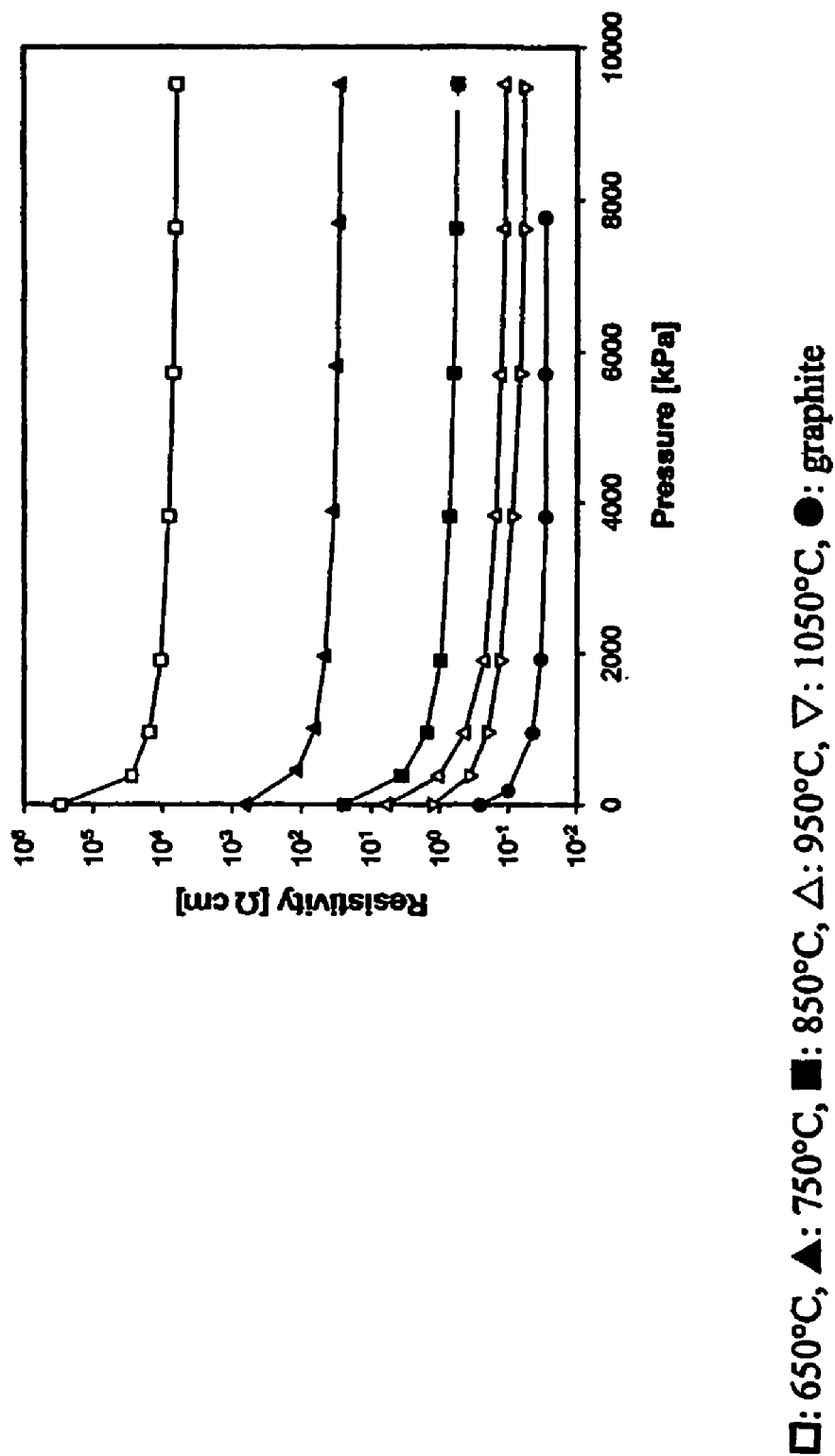
FIG. 2 is a graph of resistivity vs. compressive pressure of the carbonized charcoals described in Example 1.

Samples (0.5 g) of 20/40 mesh macadamia nutshell charcoal which had been carbonized for 10 min at temperatures of 650, 750, 850, 950, and 1050° C., were loaded into the apparatus shown in FIG. 1 and the electrical resistivity of the packed-bed, carbonized-charcoal electrode was measured as a function of applied pressure. Referring to FIG. 2, the electrical resistivity of the carbonized-charcoal packed bed decreased by more than five orders of magnitude as the carbonization temperature increased from 650 to 1050° C. Similarly, in FIG. 2 the electrical resistivity of the packed bed of carbonized-charcoal powder decreased by about a factor of 10 as the applied pressure delivered by the piston 10 (see FIG. 1) increased from 0 to about 8 MPa. For comparison, graphite powder was loaded into the apparatus and the resistivity of the graphite powder electrode was measured as a function of increasing pressure. As shown in FIG. 2 an electrode composed of a packed bed of macadamia nutshell charcoal carbonized at 1050° C. manifested an electrical resistivity (0.059 $\Omega$-cm) that was about double that of a graphite powder electrode.

Raw charcoal is typically exposed to temperatures below 600° C. when it is produced from biomass in a kiln or retort. As shown in FIG. 2 charcoal powder manifests a good electrical conductivity (comparable to graphite powder) only after it is carbonized at temperatures of 900° C. or more. Consequently, raw charcoal or charcoal exposed to temperatures below about 900° C. are not suitable for use as electrode material. Likewise, FIG. 2 shows that a carbonized-charcoal, packed-bed electrode manifests a good electrical conductivity (comparable to graphite powder) when the applied pressure to the packed bed exceeds about 1 MPa. Charcoal powder contained in a basket or charcoal powder under pressure of a typical spring will not conduct electricity sufficiently well to be used as an electrode.

EXAMPLE 2

Figure 3:
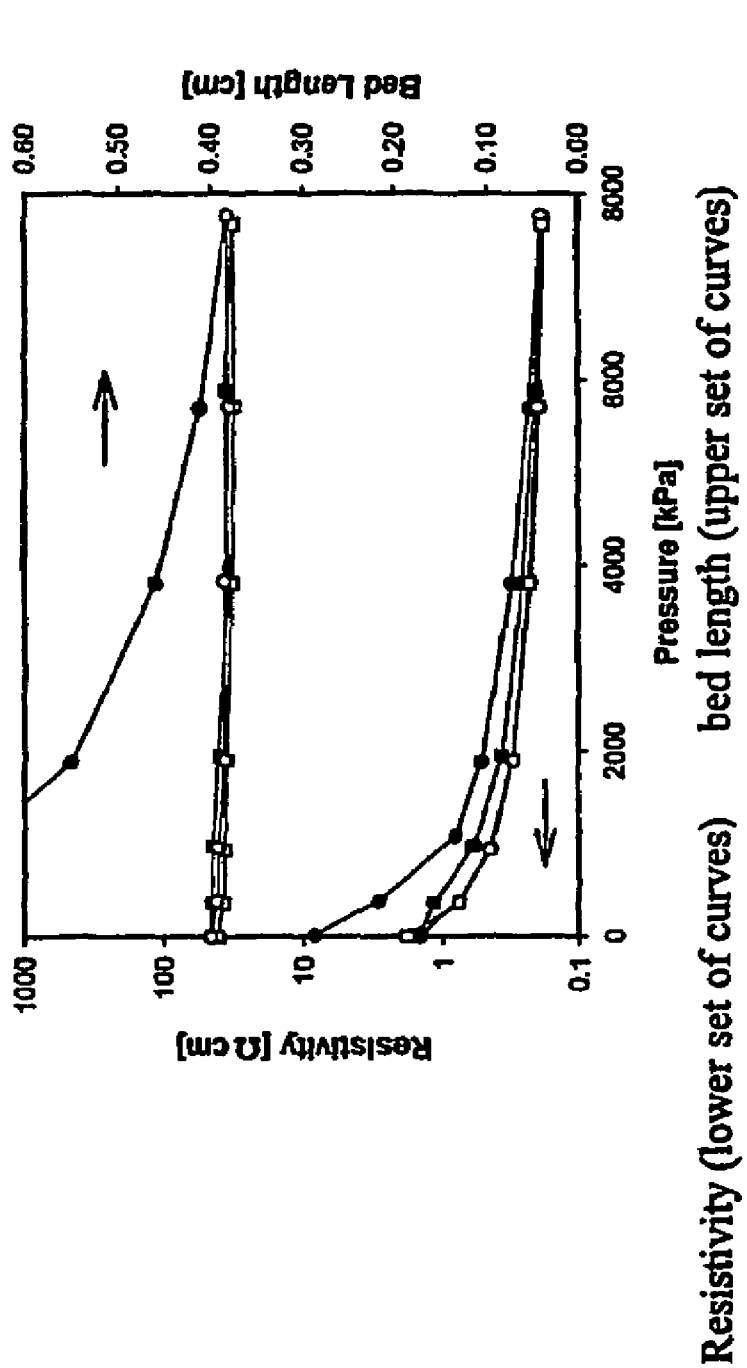
FIG. 3 is a graph of resistivity vs. compressive pressure and bed length vs. compressive pressure of carbonized charcoal described in Example 2.

A sample (0.49 g) of 20/40 mesh coconut husk charcoal, which was carbonized at 950° C., was loaded into the apparatus and the electrical resistivity of the packed-bed, coconut husk carbonized-charcoal electrode was measured as a function of applied pressure for two pressurization/depressurization cycles. As shown in FIG. 3, the electrical resistivity of the coconut husk carbonized-charcoal electrode decreased to a value of 0.18 $\Omega$-cm as the pressure applied to the electrode by the piston increased to about 6 MPa. FIG. 3 also displays the length of the carbonized-charcoal packed bed as a function of pressure. Prior to the first compression the bed was loosely packed and manifested a low electrical conductivity, but following the first compression the compacted bed was relatively dense (0.46 g/cm$^3$) and virtually incompressible.

EXAMPLE 3

Figure 4:
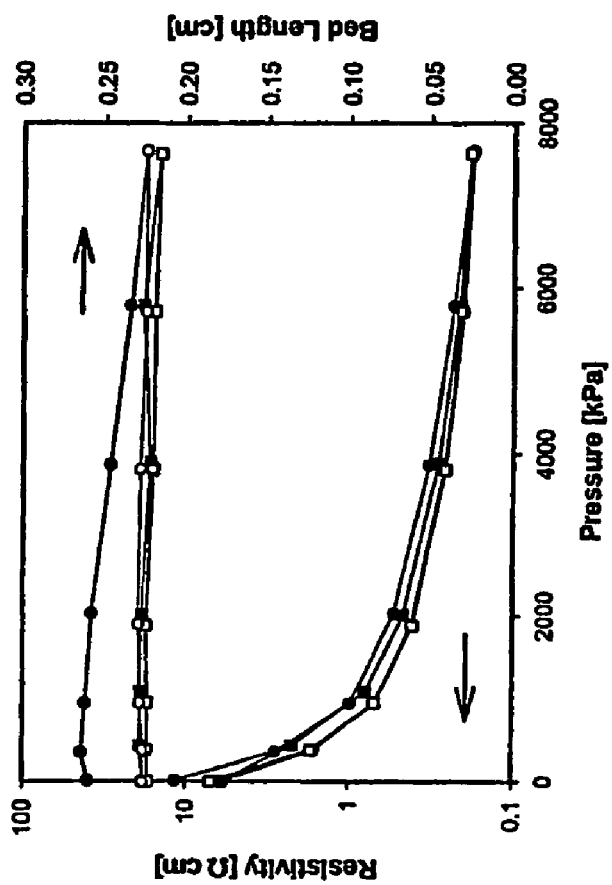
FIG. 4 is a graph of resistivity vs. compressive pressure and bed length vs. compressive pressure of carbonized charcoal described in Example 3.

A sample (0.5 g) of 20/40 mesh kukui nutshell charcoal, which was carbonized at 950° C., was loaded into the apparatus and the electrical resistivity of the packed-bed, kukui carbonized-charcoal electrode was measured as a function of applied pressure for two pressurization/depressurization cycles. As shown in FIG. 4, the electrical resistivity of the kukui nutshell carbonized-charcoal electrode decreased to a value of 0.18 $\Omega$-cm as the pressure applied to the electrode by the piston increased to above 6 MPa. FIG. 4 also displays the length of the carbonized-charcoal packed bed as a function of pressure. Prior to the first compression the bed was loosely packed, but following the first compression the compacted bed was quite dense (0.82 g/cm$^3$) and virtually incompressible.

EXAMPLE 4

Figure 5A:
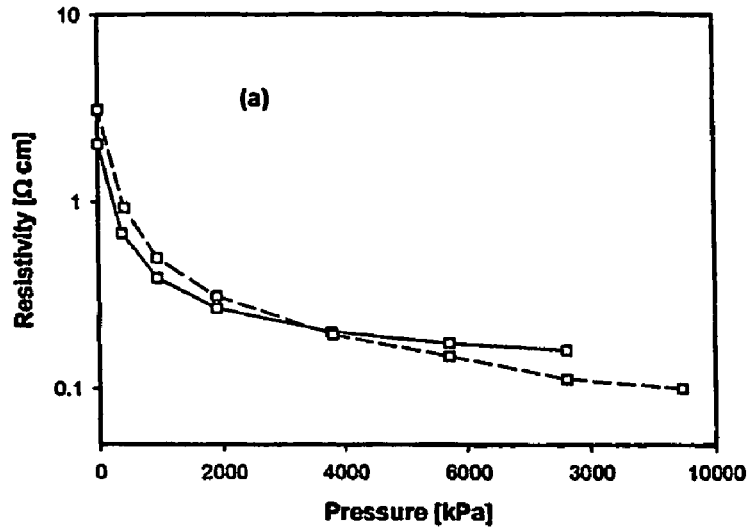
FIG. 5a is a graph of resistivity vs. compressive pressure of carbonized charcoal described in Example 4.
Figure 5B:
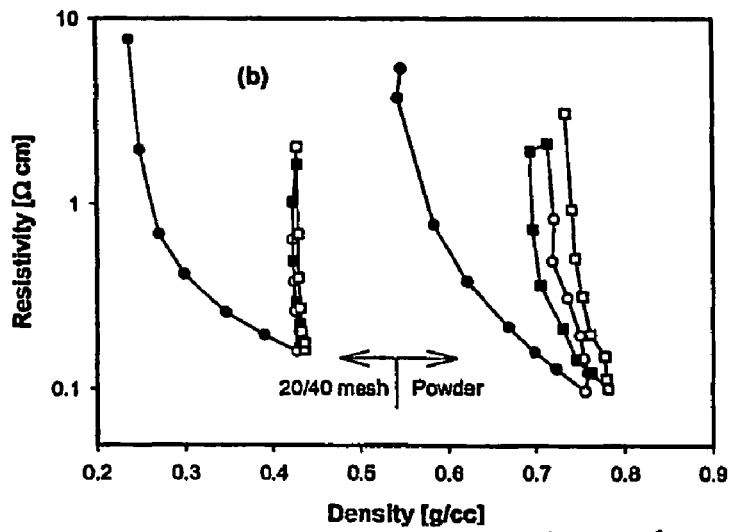
FIG. 5b is a graph of resistivity vs. density of carbonized charcoal described in Example 4.

A sample (0.5 g) of 20/40 mesh Leucaena wood charcoal, which was carbonized at 950° C. was loaded into the apparatus and the electrical resistivity of the packed-bed, Leucaena carbonized-charcoal electrode was measured as a function of applied pressure for two pressurization/depressurization cycles. As shown in FIG. 5a, the electrical resistivity of the Leucaena carbonized-charcoal electrode decreased to a value of 0.16 $\Omega$-cm as the pressure applied to the electrode by the piston increased to about 6 MPa. For comparison a 0.5 g sample of very fine Leucaena wood charcoal powder, also carbonized at 950° C. was loaded into the apparatus and the electrical resistivity of the Leucaena carbonized-charcoal powder electrode was measured. FIG. 5a shows that the electrical resistivity of this powder electrode was even lower than the 2/40 mesh carbonized-charcoal with a value of about 0.11 $\Omega$-cm at the highest pressure. FIG. 5b shows the electrical resistivity of the two electrodes as a function of the carbonized-charcoal density. Following an initial compression the 20/40 mesh carbonized-charcoal bed was virtually incompressible; whereas the fine powder evidenced some compressibility at a much higher density.

Taken together the results of Examples 3 and 4 show that the density (i.e. porosity) of the carbonized-charcoal, packed-bed electrode does not significantly influence its electrical resistivity.

Examples 1-4 show that carbonized charcoal powders derived from a wide variety of different biomass materials are well suited for use as electrode materials according to the invention.

While the invention has been described with reference to particular embodiments thereof, those of skill in the art will be able to make various modifications to the described embodiments without departing from the spirit and scope on the invention. It is intended that the foregoing embodiments are presented only by way of example and that, within the scope of the appended claims and equivalents thereto, the invention may be practiced otherwise than as specifically described.

REFERENCES CITED (1) Williams, K. R., Ed., *An Introduction to Fuel Cells.*, Elsevier Publishing Co.: Amsterdam, 1966.

(2) Bockris, J. O. M.; Srinivasan, S. *Fuel Cells: Their Electrochemistry.*; McGraw-Hill Book Co.: New York, 1969.

(3) Vielstich, W. *Fuel Cells.*; Wiley-Interscience: London, 1965.

(4) Anbar, M.; McMillen, D. F.; Weaver, R. D.; Jorgensen, P. J. Method and Apparatus for Electrochemical Generation of Power from Carbonaceous Fuels. U.S. Pat. No. 3,970,474, 1976.

(5) Anbar, M. Methods and Apparatus for the Pollution-Free Generation of Electrochemical Energy. U.S. Pat. No. 3,741,809, 1973.

(6) Gur, T. M.; Huggins, R. A. Direct Electrochemical Conversion of Carbon to Electrical Energy in a High Temperature Fuel Cell. *J. Electrochem. Soc.* 1992, 139, L95.

(7) Pesavento, P. Carbon-Air Fuel Cell. U.S. Pat. No. 6,200,697 B1, 2001.

(8) Tao, T. T. Carbon-Oxygen Fuel Cell. U.S. Patent US 2002/0015877 A1, 2002.

(8a) Antal, M. J.; Gronli, M. G. The Art, Science, and Technology of Charcoal Production. *Ind. Eng. Chem. Res.* 2003, 42, 1919.

(9) Ford, A. R.; Greenhalgh, E. Industrial Applications of Carbon and Graphite. In *Modern Aspects of Graphite Technology*; L. C. F. Blackman, Eds.; Academic Press: London, 1970; p 258.

(10) Coutinho, A. R.; Luerigo, C. A. Preparing and Characterizing Electrode Grade Carbons from Eucalyptus Pyrolysis Products. In *Advances in Thermochemical Biomass Conversion*; A. V. Bridgwater, Eds.; Blackie Academic & Professional: London, 1993; p 1230.

(11) Coutinho, A. R.; Luengo, C. A. Mass Balance of Biocarbon Electrodes Obtained by Experimental Bench Production. In *Developments in Thermochemical Biomass Conversion*; A. V. Bridgwater and D. G. B. Boocock, Eds.; Blackie Academic & Professional: London, 1997; p 305.

(12) Coutinho, A. R.; Rocha, J. D.; Luengo, C. A. Preparing and characterizing biocarbon electrodes. *Fuel Processing Technology* 2000, 67, 93.

I claim:

1. An electrode comprising
   a housing containing a bed of carbonized charcoal powder having a proximal, distal and at least one side surface;
   a moveable piston in contact with said proximal surface of said bed for applying compressive force to said bed to compress said bed sufficiently to reduce the resistivity of said bed to less than about 1 ohm-cm;
   at least one electrical contact with said bed to conduct electric current flow into or out of said bed;
   a device for applying a force to said moveable piston sufficient to cause surface pressure against said bed of at least about 1 Mpa;
   and a porous wall in contact with said bed to conduct liquid or gaseous electrolyte to and from said bed.

2. An electrode according to claim 1 wherein said charcoal powder is carbonized at a temperature of 900° C. or more for a period of at least several minutes.

3. An electrode according to claim 1 wherein said charcoal powder comprises a substantial portion of particles having a size of 1 mm or less.

4. An electrode according to claim 1 comprising two opposing pistons that apply force to said bed of carbonized charcoal powder respectively on said proximal and said distal surfaces.

5. An electrode according to claim 1 wherein said electrical contact is made with said distal surface of said bed.

6. An electrode according to claim 1 wherein said electrical contact is made with said side surface of said bed.

7. An electrode according to claim 1 wherein said electrical contact is made with said proximal surface of said bed through said piston.

8. An electrode according to any of claims 5, 6 or 7 wherein said electrical contact is attached to a source or sink of electrons through an electrically conducting wire.

9. An electrode according to claim 1 wherein said porous wall comprises said piston in contact with said proximal surface of said bed.

10. An electrode according to claim 1 wherein said porous wall is in contact with said distal surface of said bed.

11. An electrode according to claim 1 wherein said porous wall is in contact with said side surface of said bed.

12. A method for forming a carbonized charcoal powder electrode comprising the steps of
    i) loading carbonized charcoal powder which has been carbonized at a temperature above about 900° C. into an apparatus having at least one electrical contact with said powder for providing flow of electricity to or from said powder
    and said apparatus being adapted for communication of an electrolyte with said powder; and
    ii) applying a compressive force to said powder in said apparatus sufficient to form a compressed bed wherein said bed is characterized by a resistivity of less than about 1 ohm-cm.

13. A method according to claim 12 wherein said compressive force is at least about 1 MPa.

14. A method according to claim 12 wherein said resistivity is less than about 0.5 ohm-cm.

15. A method according to claim 12 wherein said carbonized charcoal powder comprises a substantial portion of particles having a size of 1 mm or less.

16. A method according to claim 12 wherein said electrical contact is attached to a source or sink of electrons through an electrically conducting wire.

* * * * *